(12) United States Patent
Schumann et al.

(10) Patent No.: US 10,476,103 B2
(45) Date of Patent: Nov. 12, 2019

(54) ELECTRODE CONTAINING SILICON AND COPOLYMER HAVING IONIC ALLY CONDUCTIVE POLYMER AND ELECTRICALLY CONDUCTIVE POLYMER, AND BATTERY CELL USING SAME

(71) Applicant: Robert Bosch GmbH, Stuttgart (DE)

(72) Inventors: Bernd Schumann, Rutesheim (DE); Pallavi Verma, Leinfelden (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 15/522,338

(22) PCT Filed: Oct. 26, 2015

(86) PCT No.: PCT/EP2015/074725
§ 371 (c)(1),
(2) Date: Apr. 27, 2017

(87) PCT Pub. No.: WO2016/071137
PCT Pub. Date: May 12, 2016

(65) Prior Publication Data
US 2017/0324111 A1   Nov. 9, 2017

(30) Foreign Application Priority Data

Nov. 5, 2014   (DE) .................. 10 2014 222 531

(51) Int. Cl.
*H01M 10/0525* (2010.01)
*H01M 4/38* (2006.01)
(Continued)

(52) U.S. Cl.
CPC ......... *H01M 10/0525* (2013.01); *C08F 26/06* (2013.01); *C08F 28/06* (2013.01);
(Continued)

(58) Field of Classification Search
CPC ...... H01M 4/133; H01M 4/386; H01M 4/622; H01M 4/624; C08F 26/06; C08G 65/08
(Continued)

(56) References Cited

U.S. PATENT DOCUMENTS

2010/0129704 A1   5/2010   Luo et al.
2011/0129729 A1*  6/2011   Kim ..................... H01M 4/133
                                                   429/209
(Continued)

FOREIGN PATENT DOCUMENTS

DE   102010051445 A1   6/2011
EP       2306562 A1   4/2011
(Continued)

OTHER PUBLICATIONS

International Search Report dated Dec. 22, 2015, of the corresponding International Application PCT/EP2015/074725 filed Oct. 26, 2015.

*Primary Examiner* — Sean P Cullen
(74) *Attorney, Agent, or Firm* — Norton Rose Fulbright US LLP; Gerard Messina

(57) ABSTRACT

An electrode for a battery cell, including an active material which contains silicon and which contains a first polymer which is ionically conductive. The active material contains in this case a copolymer, which includes the first polymer and a second polymer, the second polymer being electrically conductive. A battery cell which includes at least one electrode is also described.

17 Claims, 2 Drawing Sheets

(51) Int. Cl.
*H01M 4/62* (2006.01)
*C08F 26/06* (2006.01)
*C08F 28/06* (2006.01)
*C08G 12/08* (2006.01)
*C08G 65/08* (2006.01)
*H01M 4/133* (2010.01)
*H01M 4/36* (2006.01)
*H01M 4/60* (2006.01)
*H01M 10/052* (2010.01)

(52) U.S. Cl.
CPC .............. *C08G 12/08* (2013.01); *C08G 65/08* (2013.01); *H01M 4/133* (2013.01); *H01M 4/386* (2013.01); *H01M 4/622* (2013.01); *H01M 4/624* (2013.01); *B60Y 2200/92* (2013.01); *H01M 4/364* (2013.01); *H01M 4/606* (2013.01); *H01M 4/608* (2013.01); *H01M 4/625* (2013.01); *H01M 10/052* (2013.01); *H01M 2200/20* (2013.01)

(58) Field of Classification Search
USPC ............................................... 429/217, 231.8
See application file for complete search history.

(56) References Cited

U.S. PATENT DOCUMENTS

| | | |
|---|---|---|
| 2011/0287318 A1 | 11/2011 | Loveness et al. |
| 2012/0264880 A1* | 10/2012 | Javier .................... C08G 81/00 525/185 |
| 2013/0288126 A1 | 10/2013 | Liu et al. |
| 2014/0045065 A1 | 2/2014 | Bao et al. |
| 2014/0154572 A1* | 6/2014 | Singh .................... H01M 4/525 429/215 |
| 2014/0272572 A1 | 9/2014 | Chu et al. |
| 2014/0272595 A1 | 9/2014 | Cristadoro et al. |
| 2015/0188144 A1* | 7/2015 | Shin .................... H01M 4/0402 429/212 |

FOREIGN PATENT DOCUMENTS

| | | |
|---|---|---|
| EP | 2720303 A1 | 4/2014 |
| JP | H04264363 A | 9/1992 |
| JP | 2001257005 A | 9/2001 |
| JP | 2013016364 A | 1/2013 |
| JP | 2014514698 A | 6/2014 |
| WO | 2013116711 A1 | 8/2013 |
| WO | 2014164150 A1 | 10/2014 |

* cited by examiner

ELECTRODE CONTAINING SILICON AND COPOLYMER HAVING IONIC ALLY CONDUCTIVE POLYMER AND ELECTRICALLY CONDUCTIVE POLYMER, AND BATTERY CELL USING SAME

FIELD

The present invention relates to an electrode for a battery cell including an active material which contains silicon and which contains a first polymer which is ionically conductive. The present invention also relates to a battery cell which includes an electrode according to the present invention.

BACKGROUND INFORMATION

Electrical energy is storable with the aid of batteries. Batteries convert chemical reaction energy into electrical energy. In this context, it is differentiated between primary batteries and secondary batteries. Primary batteries are for one-time use only, while secondary batteries, which are also referred to as rechargeable batteries, are rechargeable. In this case, a battery includes one or multiple battery cells.

So-called lithium-ion battery cells are in particular used in a rechargeable battery. Battery cells of this type distinguish themselves by high energy densities, thermal stability, and an extremely low degree of self-discharge. Lithium-ion battery cells are used, inter alia, in motor vehicles, in particular in electric vehicles (EV), hybrid electric vehicles (HEV) as well as in plug-in hybrid electric vehicles (PHEV).

Lithium-ion battery cells have a positive electrode, which is also referred to as a cathode, and a negative electrode, which is also referred to as an anode. The cathode and the anode each include a current collector onto which an active material is applied. The active material for the cathode may, for example, be a metal oxide. The active material for the anode may, for example, be a graphite or a silicon.

Lithium atoms are stored in the active material of the anode. During the operation of the battery cell, i.e., during a discharging process, electrons flow in an external circuit from the anode to the cathode. During a discharging process, the lithium ions migrate within the battery cell from the anode to the cathode. An anode material, such as graphite, is able to store lithium ions in its crystal lattice if their charge is compensated for by one additional electron per lithium ion in the graphite. During a discharging process, the lithium ions are then expelled again, which is also referred to as deintercalation. During a charging process of the battery cell the lithium ions migrate from the cathode to the anode. During the process, the lithium ions are reversibly integrated into the active material of the anode, such as graphite, which is also referred to as intercalation.

The electrodes of the battery cell are designed in a foil-like manner and wound to form an electrode coil by inserting a separator in-between which separates the anode from the cathode. This type of electrode coil is also referred to as a jelly roll. The two electrodes of the electrode coil are electrically connected with the aid of collectors to the poles of the battery cell, which are also referred to as terminals. A battery cell generally includes one or multiple electrode units. The electrodes and the separator are surrounded by an electrolyte which is generally liquid. The electrolyte is conductive for the lithium ions and makes the transport of lithium ions between the electrodes possible.

The battery cell furthermore includes a cell housing which is made of aluminum, for example. The cell housing is generally prismatic, in particular cuboid-shaped, as well as pressure-resistant. The terminals are located outside of the cell housing. After connecting the electrodes to the terminals, the electrolyte is filled into the cell housing.

A generic electrode, in particular an anode, for a lithium-ion battery is described in U.S. Patent Appl. Pub. No. 2013/0288126 A1, for example. The active material of the anode contains silicon as well as an ionically conductive polymer, such as triethylene oxide.

An active material for an anode including a binder which is made of three polymers in addition to silicon and which increases the ionic conductivity of the active material is described in U.S. Patent Appl. Pub. No. 2010/0129704 A1.

U.S. Patent Appl. Pub. No. 2014/0045065 A1 describes an active material for an anode is described which contains a polymer matrix made of electrically conductive polymers and in which silicon is stored.

Another active material for an anode is described in PCT Appl. No. WO 2013/116711 A1. The active material includes a conductive polymer which is coated with silicon.

As an active material of the anode, silicon has an increased storage capacity for lithium ions as compared to graphite. The silicon as the active material of the anode is, however, exposed to attacks from chemical reactions of the silicon with the liquid electrolyte in some electrolytes. The reaction products, together with the lithium contained in them, then accumulate on the surface of the active material, where they form a layer which is referred to as "solid electrolyte interphase" (SEI). Since the silicon does not participate in the back reaction, the lithium, which accumulated there, is no longer available for intercalation and the transport of lithium ions between the electrodes. The capacity of the anodes for lithium ions continuously decreases and the cathode is then no longer able to get fully charged.

SUMMARY

An example electrode for a battery cell is provided. The electrode includes an active material which contains silicon and which contains a first polymer which is ionically conductive.

According to the present invention, the active material contains a copolymer, in particular a block copolymer which includes the first polymer and a second polymer, the second polymer being electrically conductive. The electrical conductivity of the second polymer is, in this case, preferably at least $10^{-4}$ S/cm, particularly preferably at least $10^{-1}$ S/cm.

A block copolymer includes for example several blocks made of the first polymer and several blocks made of the second polymer. The blocks made of the first polymer are, in this case, chemically bound to the blocks made of the second polymer.

The electrode according to the present invention is in particular an anode of a battery cell.

According to one advantageous embodiment of the present invention, the first polymer contains polyethylene oxide (PEO) which has a relatively good ionic conductivity. The portion of the polyethylene oxide (PEO) is preferably between 80% and 100% of the first polymer.

According to one advantageous embodiment of the present invention, the second polymer contains poly-3,4-ethylenedioxythiophene (PEDOT), polyaniline (PANI) or polypyrrole (PPY). These polymers have a relatively good electrical conductivity.

According to one advantageous embodiment of the present invention, the active material of the electrode in addition contains carbon, in particular in the form of carbon particles. The carbon particles may be present in the shape of spheres, fibers, or irregular chunks.

The active material may contain pure silicon. It is, however, also possible that the active material has an alloy containing silicon. A doping is also possible.

Alloys containing an active metal which is able to take up lithium ions are in particular possible. Aluminum, magnesium, and tin are named here by way of example.

However, an alloy containing an inactive metal which is not able to take up lithium ions is also possible. Iron, titanium, and copper are, inter alia, examples of such inactive metals.

A battery cell is also provided which includes at least one electrode according to the present invention.

A battery according to the present invention is advantageously used in an electric vehicle (EV), in a hybrid electric vehicle (HEV), or in a plug-in hybrid electric vehicle (PHEV).

The example electrode has, due to the silicon contained in the active material, an increased storage capacity for lithium ions as compared to graphite. Due to the copolymer, the active material of the electrode also has a high ionic conductivity for lithium ions as well as a high electrical conductivity for electrons. The ionically conductive first polymer functions at the same time as a glue, or as a binder, and strengthens the stability of the active material as well as the adhesion of the active material on a foil-like current collector, since it is softer and suppler on surfaces.

Likewise, the part which conducts electrons adheres to the silicon grains and also bridges, in addition to the contacts, which are already present in some instances, at the contact points of the silicon grains, another area between the silicon grains with the aid of a conductive bridge.

The silicon is tightly embedded into the copolymer, at least for the most part. In this way, contact between the electrolyte and the silicon and thus an accumulation of the electrolyte on the surface of the active material is thus prevented, at least for the most part. During the operation of the battery cell, no or only a significantly minimized formation of a "solid electrolyte interphase" (SEI) layer thus takes place.

During the intercalation of lithium ions into the silicon of the active material of the anode, the silicon expands, the volume of the silicon enlarging to up to 270%. The copolymer is relatively flexible and allows for changes in volume of this type.

BRIEF DESCRIPTION OF THE DRAWINGS

Specific embodiments of the present invention are explained in greater detail below based on the figures.

DETAILED DESCRIPTION OF EXAMPLE EMBODIMENTS

Figure 1:
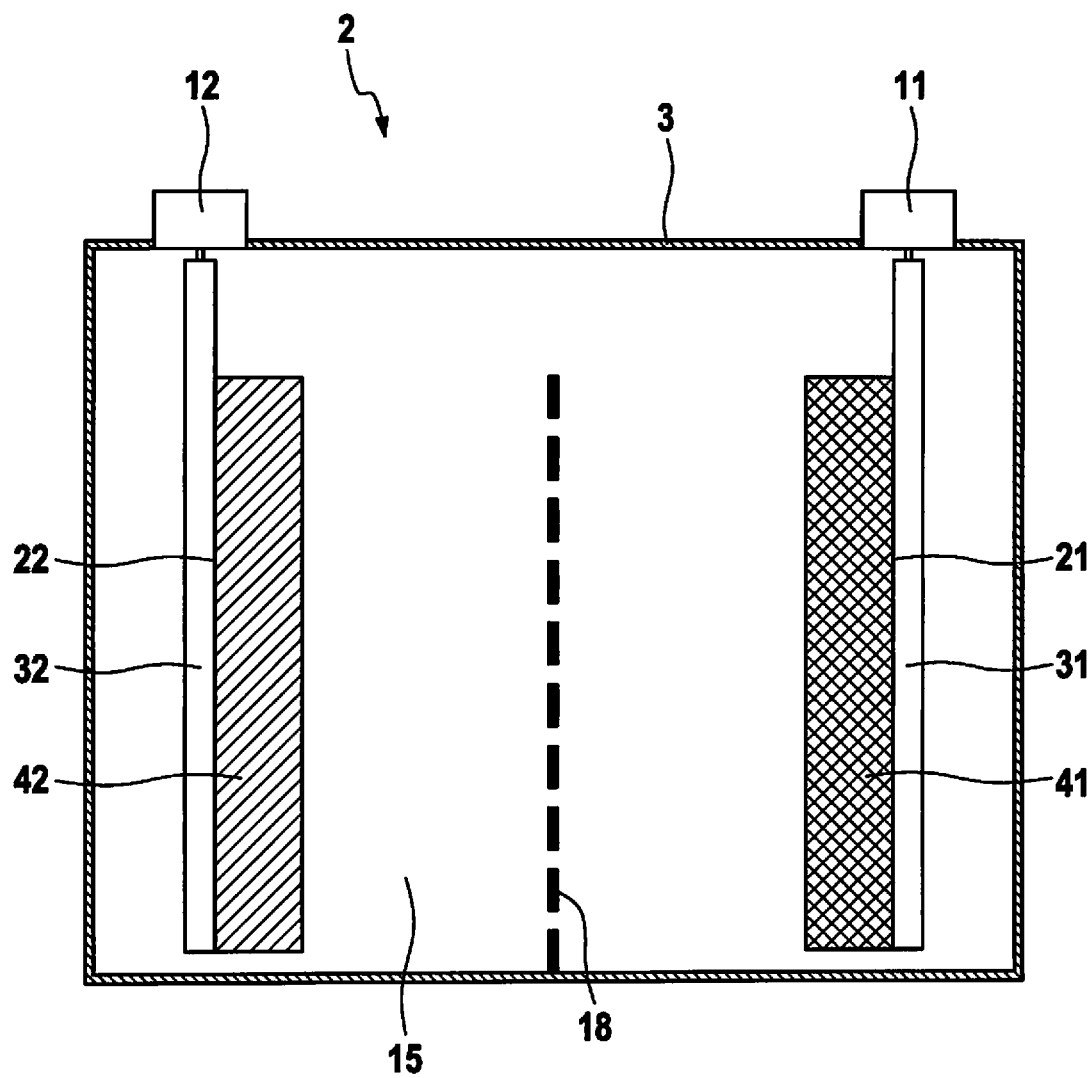
FIG. 1 shows a schematic representation of a battery cell.
Figure 2:
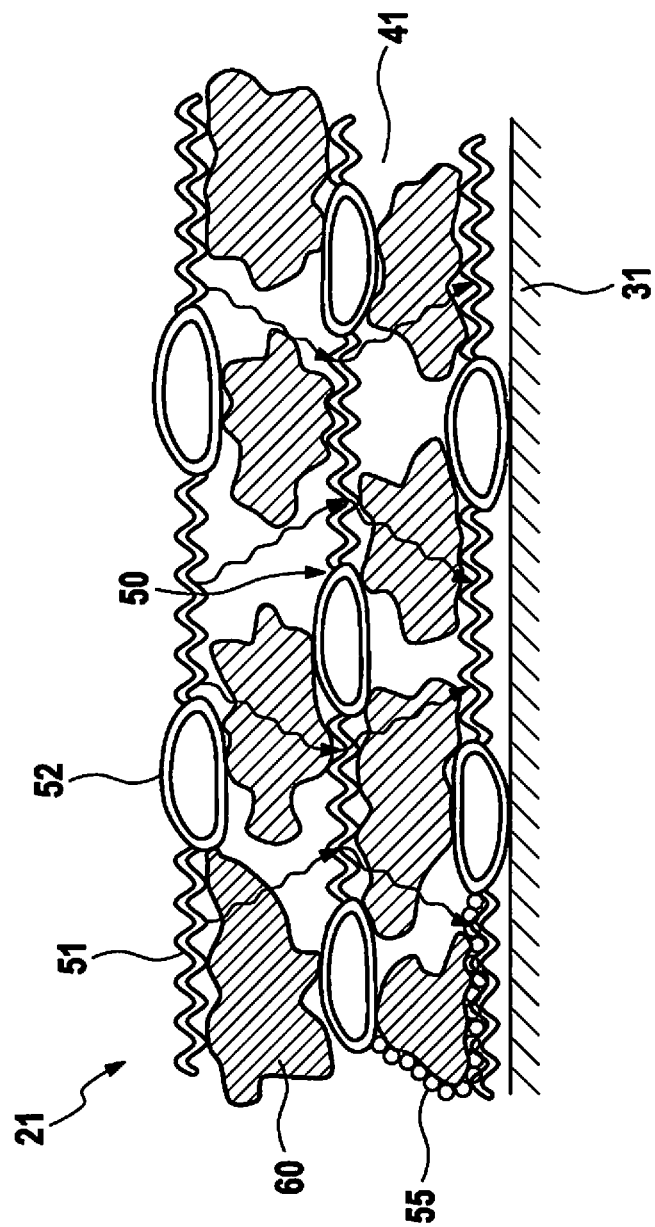
FIG. 2 shows a section through an anode in a schematic representation which is not true to scale.

A battery cell 2 includes a cell housing 3 which is prismatic, cuboid-shaped in the present case. In the present case, cell housing 3 is electrically conductive and made of aluminum, for example. Battery cell 2 includes a negative terminal 11 and a positive terminal 12. A voltage made available by battery cell 2 may be picked off via terminals 11, 12. Furthermore, battery cell 2 may also be charged via terminals 11, 12. Terminals 11, 12 are situated spaced apart from one another on a cover surface of prismatic cell housing 3.

Within cell housing 3 of battery cell 2, an electrode coil is situated which has two electrodes, i.e., one anode 21 and one cathode 22. Anode 21 and cathode 22 are each designed in a foil-like manner and wound to form an electrode coil by inserting a separator 18 in-between. It is also possible that several electrode coils are provided in cell housing 3.

Anode 21 includes an anodic active material 41 which is designed in a foil-like manner. Anodic active material 41 has silicon 60 or an alloy containing silicon 60 as its basic material. Anode 21 furthermore includes a current collector 31 which is also designed in a foil-like manner. Anodic active material 41 and current collector 31 are situated planarly to one another and connected to one another.

Current collector 31 of anode 21 is electrically conductive and made of a metal, e.g., copper. Current collector 31 of anode 21 is electrically connected to negative terminal 11 of battery cell 2.

Cathode 22 includes a cathodic active material 42 which is designed in a foil-like manner. Cathodic active material 42 has a metal oxide, e.g., lithium cobalt oxide ($LiCoO_2$), as its basic material. Cathode 22 furthermore includes a current collector 32 which is also designed in a foil-like manner. Cathodic active material 42 and current collector 32 are situated planarly to one another and connected to one another.

Current collector 32 of cathode 22 is electrically conductive and made of a metal, e.g., aluminum. Current collector 32 of cathode 22 is electrically connected to positive terminal 12 of battery cell 2.

Anode 21 and cathode 22 are separated from one another with the aid of separator 18. Separator 18 is also designed in a foil-like manner. Separator 18 is electrically insulating, but ionically conductive, i.e., permeable to lithium ions.

Cell housing 3 of battery cell 2 is filled with a liquid electrolyte 15. Electrolyte 15 surrounds anode 21, cathode 22, and separator 18. Electrolyte 15 is also ionically conductive.

Anodic active material 41 of anode 21 of battery cell 2 has a copolymer 50 which includes a first polymer 51 and a second polymer 52. First polymer 51 and second polymer 52 of copolymer 50 form, in this case, an ionically conductive and electrically conductive structure in which the polymers penetrate each other.

Silicon 60, in its pure form in the present case, is embedded in copolymer 50. In this case, silicon is present in the form of particles which have a size of several nanometers or micrometers.

Instead of or in addition to pure silicon 60, anodic active material 41 may also have an alloy containing silicon 60. This may be an alloy formed with an active metal, such as aluminum, magnesium, or tin, i.e., with a metal which is able to take up lithium ions. However, an alloy formed with an inactive metal, such as iron, titanium, or copper, i.e., a metal which is not able to take up lithium ions, is also possible.

First polymer 51 of copolymer 50 is ionically conductive, i.e., permeable to lithium ions. Lithium ions may thus migrate through first polymer 51 and thereby also through anodic active material 41 of anode 21. Polyethylene oxide (PEO) may be used as the material for first polymer 51.

First polymer 51 functions at the same time as a glue, or as a binder, for anodic active material 41. First polymer 51 thus increases the mechanical stability of anodic active material 41 and improves the adhesion of anodic active material 41 on current collector 31 of anode 21.

Second polymer 52 of copolymer 50 is electrically conductive, i.e., permeable to electrons. Electrons may thus migrate through second polymer 52 and thereby also through anodic active material 41. Poly-3,4-ethylenedioxy-thiophene (PEDOT), polyaniline (PANI) or polypyrrole (PPY) may be used as the material for second polymer 52, for example.

Copolymer 50 is, however, impermeable to electrolyte 15. Electrolyte 15 is thus not able to penetrate copolymer 50 and consequently does not get in contact with silicon 60. As a result, electrolyte 15 is not able to accumulate on silicon 60, or on the alloy containing silicon 60, of anodic active material 41. Copolymer 50 thus acts as a barrier for electrolyte 15.

In the case of lithium accumulation, silicon 60 expands. In the case of such an expansion of silicon 60 of anodic active material 41, copolymer 50 expands accordingly, in an elastic manner, and continues to form a barrier which is impermeable to electrolyte 15.

Anodic active material 41 furthermore contains carbon 55 which is integrated into anodic active material 41 in the form of carbon particles. Carbon 55 allows for a good contact between second polymer 52 and silicon 60.

The present invention is not limited to the exemplary embodiments described here and the aspects emphasized therein. A plurality of modifications, which are within the scope of those skilled in the art, is possible, in accordance with the present invention.

What is claimed is:

1. An electrode for a battery cell, including an active material which contains:
    at least one of silicon and an alloy including silicon,
    a first polymer which is ionically conductive,
    a copolymer which includes the first polymer and a second polymer, the second polymer being electrically conductive, wherein the at least one of the silicon and the alloy including silicon is embedded as grains in the copolymer so as to prevent contact between an electrolyte in the battery cell and the grains of the at least one of the silicon and the alloy including silicon, wherein:
       the at least one of silicon and the alloy including silicon includes a plurality of grains of at least one of silicon and the alloy including silicon,
       the second polymer includes a plurality of blocks, and
       at least one of the plurality of blocks of the second polymer contacts a first and a second of the grains such that the at least one of the blocks serves as an electronically conductive bridge between the first and the second grains.

2. The electrode as recited in claim 1, wherein the electrode is an anode of the battery cell.

3. The electrode as recited in claim 1, wherein the first polymer contains polyethylene oxide.

4. The electrode as recited in claim 1, wherein the second polymer contains one of polyaniline (PAM) or polypyrrole (PPY).

5. The electrode as recited in claim 1, wherein the active material contains carbon.

6. The electrode as recited in claim 1, wherein the at least one of the silicon and the alloy including silicon is embedded in the copolymer as one of nanometer grains and micrometer grains.

7. The electrode as recited in claim 1, wherein at least some of the silicon grains are disposed in the active material in direct contact with the first polymer and the second polymer.

8. The electrode as recited in claim 1, wherein the alloy contains an active metal which is able to take up lithium ions.

9. The electrode as recited in claim 8, wherein the active metal includes one of aluminum, magnesium, and tin.

10. The electrode as recited in claim 1, wherein the alloy contains an inactive metal which is not able to take up lithium ions.

11. The electrode as recited in claim 10, wherein the inactive metal includes one of iron, titanium, and copper.

12. A battery cell, including at least one electrode, the electrode including an active material which contains silicon and a first polymer which is ionically conductive, wherein the active material contains a copolymer which includes the first polymer and a second polymer, the second polymer being electrically conductive, wherein the silicon is embedded as grains in the copolymer so as to prevent contact between an electrolyte in the battery cell and the grains of the silicon, wherein:
    the silicon includes a plurality of grains of silicon,
    the second polymer includes a plurality of blocks, and
    at least one of the plurality of blocks of the second polymer contacts a first and a second of the grains such that the at least one of the blocks serves as an electronically conductive bridge between the first and the second grains.

13. The battery cell as recited in claim 12, wherein the silicon is embedded in the copolymer as one of nanometer grains and micrometer grains.

14. The battery cell as recited in claim 12, wherein at least some of the silicon grains are disposed in the active material in direct contact with the first polymer and the second polymer.

15. A method of using a battery cell, comprising:
    providing a battery cell in one of an electric vehicle, a hybrid electric vehicle, or a plug-in hybrid electric vehicle, the battery cell including at least one electrode, the electrode including an active material which contains silicon and a first polymer which is ionically conductive, wherein the active material contains a copolymer which includes the first polymer and a second polymer, the second polymer being electrically conductive, wherein the silicon is embedded as grains in the copolymer so as to prevent contact between an electrolyte in the battery cell and the grains of the silicon; and
    using the battery cell in the electric vehicle, the hybrid electric vehicle, or the plug-in hybrid electric vehicle, wherein:
       the silicon includes a plurality of grains of the silicon,
       the second polymer includes a plurality of blocks, and
       at least one of the plurality of blocks of the second polymer contacts a first and a second of the grains such that the at least one of the blocks serves as an electronically conductive bridge between the first and the second grains.

16. The method as recited in claim 15, wherein the silicon is embedded in the copolymer as one of nanometer grains and micrometer grains.

17. The method as recited in claim 15, wherein at least some of the silicon grains are disposed in the active material in direct contact with the first polymer and the second polymer.

* * * * *